June 18, 1968   K. J. STETTEN   3,389,219
APPARATUS FOR SCAN CONVERSION
Filed July 9, 1965
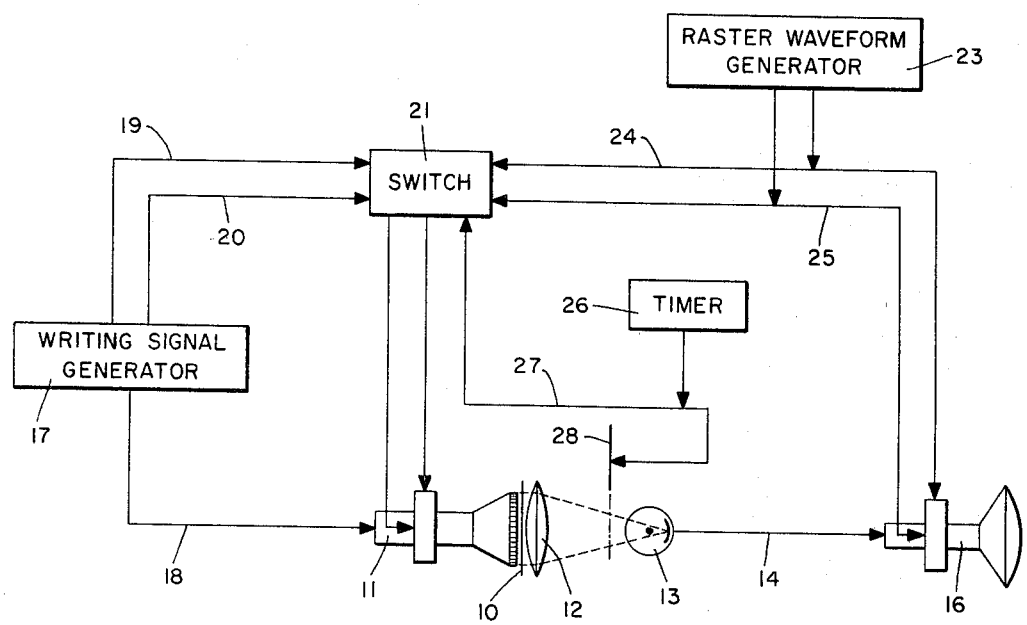
INVENTOR.
KENNETH J. STETTEN
BY
ATTORNEY United States Patent Office 3,389,219
Patented June 18, 1968

3,389,219
APPARATUS FOR SCAN CONVERSION
Kenneth J. Steffen, McLean, Va., assignor, by mesne assignments, to Westinghouse Electric Corporation, Pittsburgh, Pa., a corporation of Pennsylvania
Continuation-in-part of application Ser. No. 409,497, Nov. 6, 1964. This application July 9, 1965, Ser. No. 477,339
2 Claims. (Cl. 178—6.8)

ABSTRACT OF THE DISCLOSURE

A display system wherein signal generating means are combined with a single cathode ray tube and display means to write and read information with high accuracy and resolution and continuous total capability.

---

This invention relates to a display system having a scan converter and, more particularly, to an improved method and apparatus for scan conversion.

Scan conversion involves converting electric signals from one form to another where the latter form usually involves a scanning pattern susceptible to producing a visual display as on a cathode ray tube. Scan converters are useful in radar systems for converting polar coordinate information such as radar, PPI signals into standard TV signals. Scan converters are also useful in traffic control systems, inventory control systems and others. While there are a variety of scan converters available at the present time, and of storage tubes that may operate as scan converters, most are of limited tonal characteristics and have relatively low resolution capabilities. In addition, scan converters that employ more than one electron gun are relatively inaccurate due to the accumulation of errors caused by the plural components.

The present invention involves the use of photochromic materials as a storage media in a scan converter. As is known, photochromic materials exhibit photochromism, and both the materials and publications such as, for example, U.S. Patents 2,953,454 and 3,134,674 and "The Journal of Physical Chemistry," vol. 66, December 1962, No. 12, published by The American Chemical Society, Easton, Pa. In the present invention, the photochromic material is preferably embodied in a self supporting transparent film known as photochromic film into which information is introduced by the process known as "writing" and from which information is extracted by the process known as "reading." The reading and writing are accomplished by light of a given waveband or frequency. Preferably, a photochromic material is chosen which has a low absorbability to the reading light when unexcited and a high absorbability to the reading light when excited. The reading light is at an intensity or energy level below that which excites the material. In contrast to the prior art, the present invention utilizes the variable absorbability of light with the writing or exciting waveband to extract information whereas the prior art appears to utilize the absorption of light of a waveband or frequency different from that of the exciting light, to extract the information.

Accordingly, one of the objects of the invention is to provide a method and apparatus for scan conversion that provides high accuracy, high resolution and continuous total capability.

Another object is to provide a scan converter that employs a photochromic or other direct print out film as a storage device.

Still another object is to provide a scan converter having an extremely small error of conversion.

A further object is to provide a novel method for using photochromic material as a storage media where light of a given waveband or frequency is utilized to both write and extract information.

Other objects and advantages of the invention will be apparent from the following description taken in connection with the accompanying drawing which is a schematic block diagram of a display system embodying the invention.

Referring now to the drawing, there is illustrated a display system employing a photochromic film 10 which is written on and read from by light produced by a cathode ray tube or CRT 11. CRT 11 is a high resolution type and includes a fiber optic face plate or screen coated on its inner surface with a phosphor that emits light of the predetermined frequency or waveband that excites film 10. CRT 11 also includes a single electron gun for producing the electron beam, deflectors for deflecting the electron beam, a focus adjustment, and a grid by means of which the intensity of the electron beam can be modulated or controlled. The intensity of the light produced by the electron beam is a function of the signal applied to the grid.

Photochromic film 10 contains a photochromic material that is excitable by the light produced by the phosphor of CRT 11 whereby the CRT may be used to write on the film. Preferably, the photochromic material is of a type that can be excited by ultra-violet light, erased by infra red light, and is stable in visible light at the operating temperature of the converter which advantageously is room temperature.

Photochromic film 10 is disposed adjacent to or against the screen of CRT 11 so that the light emitted by the phosphor is piped out through the fiber optics, wherein the fibers are parallel to each other, so as to irradiate those portions of the film directly in front of those portions of the phosphor emitting the light. A lens 12 is disposed in front of film 10 and collects and focuses the light which passes through film 10 on a multiplier phototube 13 which is responsive to light and within the reading light waveband to provide an output signal 14 proportional to the intensity to the light focused thereon. Signal 14 is fed to the grid of a display CRT 16 for modulating the intensity of the electron beam thereof. CRT 11, photochromic film 10, lens 12 and phototube 13 form a scan converter which is operable, as described hereafter to alternately write and read and thereby convert electrical input signals of one form into electrical output signals of another form.

A writing signal generator 17, which may be a suitable computer, programmer, etc. provides an output video signal 18 that is fed to the grid of CRT 11 for modulating the electron beam intensity. Generator 17 also provides two output deflection signals 19 and 20 that are fed to a switch 21 which, when closed to such signals, passes the signals to the horizontal and vertical deflectors of CRT 11 to deflect the electron beam in accordance with such signals. Output signals 18–20 are synchronized to modulate the intensity and deflection of the electron beam and thereby activate the phosphor of CRT 11 to produce light that irradiates film 10 and thereby introduces information into film 10 characterized by variations in the degree of excitation or absorbency of the individual portions, i.e., elemental areas, of the film.

The display system further includes a raster waveform generator 23 that produces output deflection signals 24 and 25 which are simultaneously fed to CRT 16 and switch 21. These signals are fed to the horizontal and vertical deflectors of CRT 16 to deflect the electron beam and provide a standard television raster. When switch 21 is closed to such signals, they are also fed to the deflectors of CRT 11 causing the electron beam thereof to scan the screen in a pattern of the raster and in synchronism with the raster of CRT 16.

A timer 26, which may be a mechanical, electromechanical or electric timer, provides an output signal 27 for controlling the writing and reading periods of operation. Switch 21, which also may be mechanical, electrical or electronic, is in the nature of a double-pole double-throw switch designed to connect CRT 11 alternately to writing signal generator 17 or to raster waveform generator 23. The output signal 27 is also fed to a shutter 28 here illustrated simply as a mechanical shutter that is movable from the full line position shown in the drawing, which lies outside the path of the light focused on phototube 13, to the dotted position where it is effective to block the light transmitted through film 10, phototube 13 and thereby prevent saturation thereof due to any relatively high intensity light received during writing. Signal 27 is provided only during writing periods and when it is not provided, the shutter is ineffective to block the transmission of light to phototube 13 and switch 21 connects CRT 11 to generator 23.

During writing, timer 26 feeds signal 27 to switch 21 closing it relative to signals 19 and 20 causing them to pass to the deflectors of CRT 11. Generator 17 produces output signals 18–20 that modulate the intensity and deflection of the electron beam and thereby write the desired information on film 10. The informaton may be numbers, lettters, symbols, pictures, etc., and since the scan converter is highly accurate, the information may be represented by both the positions and the configurations of the written material. When the writing is completed, timer 26 cuts off signal 27 causing CRT 11 to be connected to generator 23. The grid of CRT 11 is biased so that in the absence of a video signal 18, the intensity of the electron beam is constant and at a low level to produce a spot of reading light whose intensity is constant and below that which excites film 10. During reading, signals 24 and 25 cause CRT 11 to act as a flying spot scanner that produces a moving spot of light which scans film 10 in the raster pattern. The light emitted by the moving spot of light is transmitted through the adjacent portion of elemental area of film 10 accordance with the transmissivity or absorptiveness of the elemental area whereby the light that passes through film 10 hits phototube 13 and produces output signal 14 which modulates the intensity of the electron beam of CRT 16 so as to form on the screen thereof a visual picture or display of the information in film 10.

By varying the intensity of the writing light, the intensity of the reading light that passes through film 10 will vary so that the resultant display may have different tones, ranging continuously from light to dark. Furthermore, the information in film 10 can be erased simply by irradiating the film with infra-red light.

By using the same electron gun for both reading and writing, the scan converter produces a relatively small error in the conversion. Additionally, since the photochromic film is grainless its resolution is better than that of the best photographic film available and the resolution of the converter approaches that of cathode ray tube 11. Moreover, the cathode ray tube 11 may be an off-the-shelf high resolution tube, since it is not necessary to incorporate the film 10 in the interior of the tube, and this results in a lower cost system.

While only a single embodiment has been illustrated, it will be apparent to those skilled in the art that many changes can be made in the details and arrangements of the parts and steps without departing from the scope of the invention as defined in the appended claims.

In addition to the use of photochromic film, at least one other type of film sensitive to ultra-violet light may also be employed. For example, a film known as Kalvar film, marketed by the Kalvar Corporation, has the property of forming bubble nucleation centers at those portions of its surface irradiated by ultra-violet lights. The film is substantially transparent in its unexcited state. Such films are described in several United States patents, among them are 2,911,229 and 2,976,145. Development is effected by subsequent or simultaneous heating of the Kalvar film, causing bubble nucleation centers to form small bubble clusters within the film. These bubbles are of a different index of refraction than that of the film and give rise to semi-opague areas which are effectively of a different optical transmissivity than the remainder of the film.

In view of these properties of Kalvar film, the reader is now in a position to recognize that Kalvar film may also be employed as the film 10 illustrated in the drawing. In such a substitution, the Kalvar film is placed in two rotating spools (or any other convenient film transport arrangement) and a suitable heat source such as a hot air blower directed against the film or an infra-red lamp irradiates the film. The Kalvar film is continuously irradiated (heated) by the infra-red lamp or continuously heated by the hot air draft. This heating develops the Kalvar film causing it to rapidly develop so that during reading there is contrast on the film to thereby yield the final image for viewing. As with the use of photochromic film, reading occurs at a lower intensity level of the electron beam from the CRT 11 than that employed in writing.

A film transport mechanism, such as common supply and take-up reels, is required in the case of Kalvar film because the developed image is permanent. Thus, not only does the use of Kalvar film admit of the same advantages enjoyed as previously set forth in regard to the scan conversion system of this invention using photochromic film, but it further enables a permanent record to be made of the information displayed by the CRT 16.

Both photochromic film and Kalvar type film, when the latter is preheated, may be regarded as direct print out films. Such films require no special development as image-fixing process after exposure, exposure alone resulting in a visible change in the transmissivity of the film. Since both types are susceptible of use in the scan conversion system of this invention, the phase light sensitive is intended to include any direct print out type of film.

This application is a continuation-in-part application of Ser. No. 409,497, filed Nov. 6, 1964, now abandoned.

What is claimed is:

1. A display system including: a high resolution cathode ray tube for producing light within a given waveband and a variable areal distribution and intensity, light sensitive means disposed so as to be irradiated by said light, said light sensitive means being substantially transparent when unexcited and characterized by the formation therein of bubble nucleation centers when irradiated by said light above a predetermined energy level, the bubble nucleation centers expanding upon the application of heat to said light sensitive means to form bubbles having a different index of refraction than that of said light sensitive means, first means for producing input deflection and video signals for activating said cathode ray tube to write on said light sensitive means, second means for producing a raster wave form, switch means operable to connect the said cathode ray tube alternately to said first and second means to alternately write and scan said light sensitive means with light radiated by said cathode ray tube, phototube means, means for focusing light that passes through said light sensitive means, when said cathode ray tube is connected to said second means, on said phototube means to translate such light received thereby into an output video signal, and display means operative by said signals from said second means and said phototube means to produce a display in accordance with such signals.

2. A scan converter including a cathode ray tube having a single electron gun for producing an electron beam, deflectors for deflecting said electron beam, a grid for controlling the intensity of said electron beam, and a screen coated with a phosphor which upon being struck by said electron beam emits light of a given waveband or frequency and of an intensity proportional to the intensity of the electron beam, a light sensitive film arranged so that elemental areas thereof are irradiated by light emanating from corresponding elemental areas of said screen, said light sensitive film beam characterized as substantially transparent when unexcited and of forming bubble nucleation center when excited, the number of bubble nucleation centers being proportional to the intensity of exciting light received thereby, means for heating said light sensitive film, phototube means adapted to receive light emitted from said cathode ray tube and transiting said light sensitive film and means for feeding writing and reading signals to said cathode ray tube to operate said tube and produce light for alternately writing on and reading said light sensitive film, said reading light from said cathode ray tube being at a constant intensity below that which will excite said light sensitive film.

References Cited

UNITED STATES PATENTS

| | | | |
|---|---|---|---|
| 2,535,817 | 12/1950 | Skellert | 313—91 |
| 3,148,281 | 8/1964 | Fyler | 350—160 |
| 3,253,497 | 5/1966 | Dreyer | 313—91 |

ROBERT L. GRIFFIN, *Primary Examiner.*

J. H. ORSINO, *Assistant Examiner.*